A. GILLESPIE.
TALLY MACHINE.
APPLICATION FILED FEB. 18, 1911.

1,081,952.

Patented Dec. 23, 1913.
8 SHEETS—SHEET 3.

WITNESSES
R. A. Leduc
J. E. Donebach

INVENTOR
Angus Gillespie
BY
Frank C. Curtis
ATTORNEY

A. GILLESPIE.
TALLY MACHINE.
APPLICATION FILED FEB. 18, 1911.

1,081,952.

Patented Dec. 23, 1913.

WITNESSES:
R. A. Leduc.
J. E. Donebach.

INVENTOR
Angus Gillespie
BY
Frank C. Curtis,
ATTORNEY

A. GILLESPIE.
TALLY MACHINE.
APPLICATION FILED FEB. 18, 1911.

1,081,952.

Patented Dec. 23, 1913.
8 SHEETS—SHEET 8.

WITNESSES.
R. A. Leduc.
J. E. Donsbach.

INVENTOR
Angus Gillespie
BY Frank C. Curtis
ATTORNEY

UNITED STATES PATENT OFFICE.

ANGUS GILLESPIE, OF TROY, NEW YORK.

TALLY-MACHINE.

1,081,952.    Specification of Letters Patent.    Patented Dec. 23, 1913.

Application filed February 18, 1911. Serial No. 609,498.

*To all whom it may concern:*

Be it known that I, ANGUS GILLESPIE, a subject of the King of Great Britain, residing at Troy, county of Rensselaer, and State of New York, have invented certain new and useful Improvements in Tally-Machines, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

The general object of the invention is to provide for accurately keeping tally of the respective numerical quantities of a large variety of articles.

Specific objects of the invention will appear in connection with the following description.

The machine is adapted for keeping tally of a large number and variety of subjects, and is particularly adapted for keeping tally of the number of collars of different sizes and styles sold or delivered from time to time.

In carrying out my invention, I employ as counters small balls or shot, and provide suitable receptacles therefor, each receptacle being adapted to receive the balls indicating the total number of some particular style, size or character; and suitable mechanism for distributing to the proper receptacles the proper number of balls to indicate the true count for the several articles or subjects.

Referring to the drawings wherein the invention is shown in preferred form, 1, is a ball-supply-magazine, from which lead a plurality of supply-chutes, 2, each adapted to supply balls to a delivery-chute 3.

For certain purposes of the invention the balls, 5, may be delivered one by one to the delivery-chute at the will of the operator by any known mechanism, or in any known manner.

Figures 5, 6, 7, 8, 9:
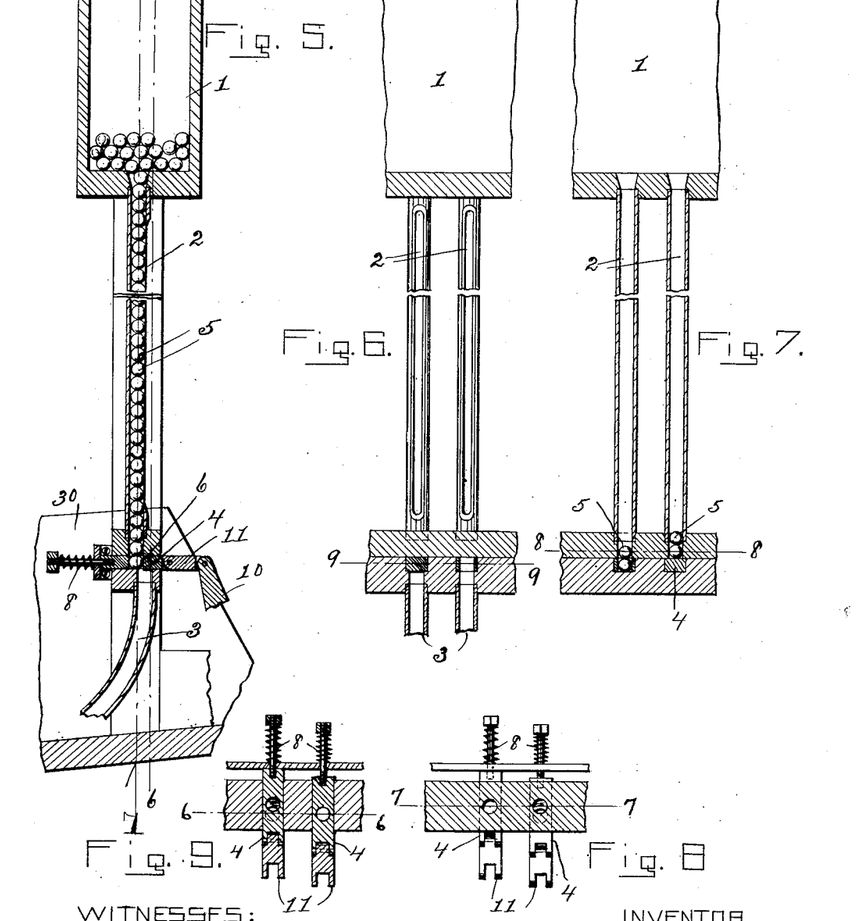
Fig. 5 is a vertical longitudinal section taken centrally through a supply-chute and a delivery-chute, showing the means for transferring the balls one at a time from the supply-chute to the delivery-chute.
Fig. 6 is a vertical cross-section taken on the broken line 6—6 in Fig. 5, its plane of section being also indicated by the broken line 6—6 in Fig. 9.
Fig. 7 is a similar cross-section taken on the broken line 7—7 in Fig. 5, its plane of section being also indicated by the broken line 7—7 in Fig. 8.
Fig. 8 is a horizontal section taken on the broken line 8—8 in Fig. 7.
Fig. 9 is a horizontal section taken on the broken line 9—9 in Fig. 6.

I have shown in Fig. 5 the delivery-chute slightly out of line with the supply-chute; and, as a preferred means for transferring the balls one at a time from the supply-chute to the delivery-chute, I have shown a slide, 4, provided with an aperture, 6, extending vertically therethrough, adapted in one position of the slide to receive the lowermost ball from the supply-chute, and in another position to register with the delivery-chute to permit said ball to fall thereinto. Such a slide is provided for each supply-chute, each slide being yieldingly held in position to register therewith by means of a coil-spring, 8, and adapted to be moved into position to register with the delivery-chute by means of a key, 10, connected by a link, 11, with said slide.

In Figs. 8 and 9 two neighboring slides are shown in each figure, one of the slides being shown in position to register with the supply-chute, and the other slide in position to register with the delivery-chute. A separate key is provided for each delivery-chute, which keys are manipulated at the will of the operator to deliver the balls into selected delivery-chutes. The balls deposited in the delivery-chutes are guided into and permitted to accumulate in the proper members of a series of ball-receptacles, as will be hereinafter described. The ball-receptacles are shown in the form of tubes, 12, supported in vertical position in rows in the respective racks 13.

Figures 10, 11:
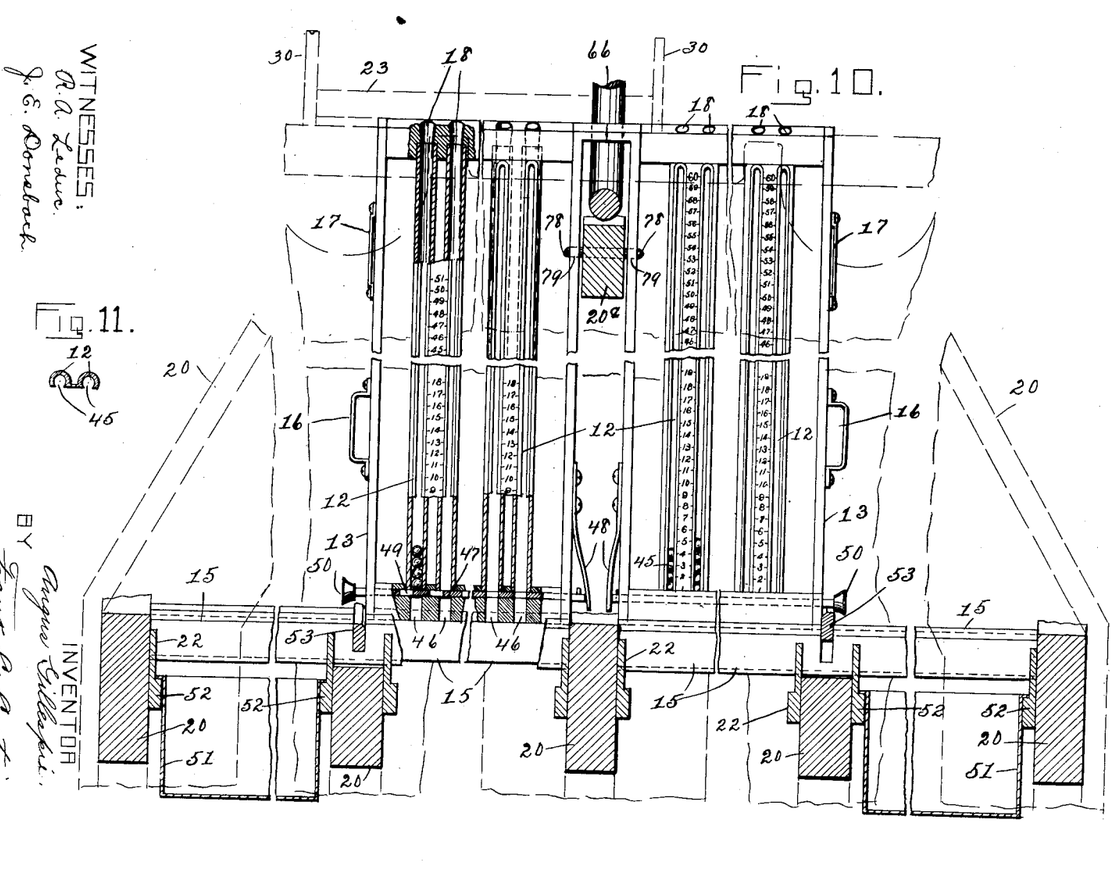
Fig. 10 is a vertical cross-section taken on the broken line 10—10 in Fig. 1, looking toward the front of the machine, the front framework of the machine being indicated by broken lines.
Fig. 11 is a cross-section of two of the ball-receptacles, shown in the form of twin tubes.
Figures 12, 13:
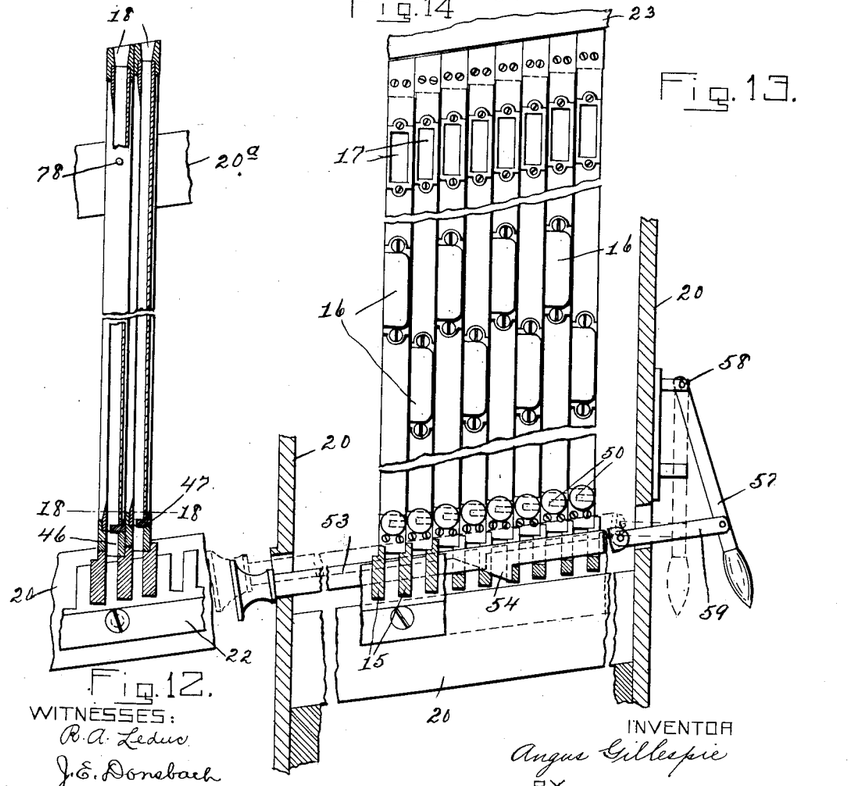
Fig. 12 is a vertical longitudinal section taken through two of the ball-receptacle racks and their slideway-supports.
Fig. 13 is a view on an enlarged scale partly in side elevation and partly in vertical section of a series of ball-receptacle racks and the means for locking the series of racks in position in their slideway-supports.
Figures 14, 15, 18:
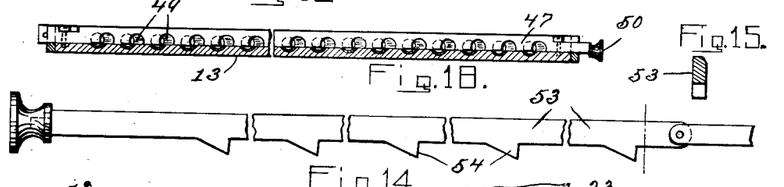
Fig. 14 is a view in side elevation of the locking-bar for locking the series of racks in position in their slideway-supports.
Fig. 15 is a vertical cross-section of the same.
Fig. 18 is a view partly in plan and partly in horizontal section on the broken line 18—18 in Fig. 12, showing the release-valve whereby the escape of the balls from the receptacles in one of the racks is permitted.
Figure 16:
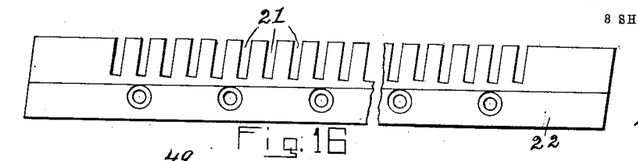
Fig. 16 is a view in side elevation of a notched support-plate for the ends of the slideway-bars which support the series of racks.
Figure 17:
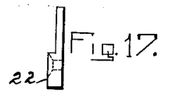
Fig. 17 is an end view of the same.
Figure 19:
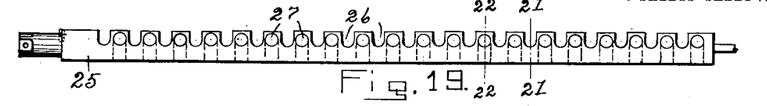
Fig. 19 is a side view of one of the switch-bars detached.
Figure 20:
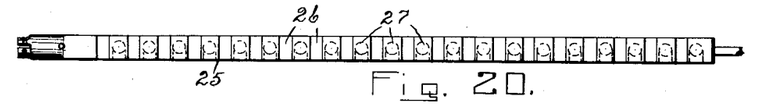
Fig. 20 is a plan view of the same.

For convenience in supporting, removing and inserting the receptacles, the tubes are preferably made in twin-form or pairs, as shown in Fig. 11, and a plurality of said twin-tubes are mounted in fixed relation to each other upon a rack, 13, which rack extends transversely of the machine with one of its ball-receiving tubes in line with each of the delivery-chutes 3. A series of ball-receptacle racks, 13, is preferably employed, the racks being arranged parallel with each other, and each rack being adapted to be slid in and out of position in the machine along a slideway formed by the slideway-bars 15. As a means for sliding the racks into and out of position, each rack is shown provided with a handle, 16; and, as a means for identifying the style of article for which tally is to be kept by means of the several racks, each rack is provided with a label-holder 17. The upper ends of the tubes, 12, in each transverse row are mounted in the top-bars of the respective racks, 13, in position to register with apertures, 18, extending through said top-bar and corresponding in area with the respective tubes. The several racks, 13, are removably mounted upon a framework, 20, by means of the slideway-bars, 15, which slideway-bars have their opposite ends supported in the respective notches, 21, in a plate, 22, fixed upon said framework. The racks are thus supported immediately beneath a switch-plate, 23, formed with apertures, 24, adapted to register with the respective apertures, 18, in the top-bars of the several racks.

Mounted in slideways extending transversely of the machine along the upper side of the switch-plate are a plurality of switch-bars, 25, one for each of the racks, 13, in vertical line therewith, each of which switch-bars is formed with a plurality of guideways, 26, adapted in a certain position of the switch-bar to form continuations of the respective delivery-chutes, 3, to permit balls from the delivery-chute to run past said switch-bar, and the rack subjacent thereto. Each switch-bar is also formed with a like plurality of guideways, 27, provided with openings in the front side of the bar adapted in a certain other position of the bar to form continuations of the respective delivery-chutes, 3, and with openings in the bottom of the bar adapted in said other position of the bar to register, respectively, with certain of the openings, 24, in the switch-plate 23. When the switch-bar is in the position last referred to, balls from the delivery-chute will be guided by the guideways, 27, down through the respective apertures, 24, in the switch-plate and respective apertures, 18, in the top-bar of the subjacent rack, into the respective tubes, 12, in said rack, in which tubes the balls are permitted to accumulate to indicate the count or tally. When the switch-bar is in the first-mentioned position, the balls from the delivery-chutes pass the switch-bar and each successive switch-bar in a similar position, until it reaches a switch-bar which is in position to direct the balls down into the receptacle-tubes.

As many of the racks, 13, and as many tubes in each rack may be employed as may be desirable for the intended use of the machine.

In the construction illustrated in the drawings, each rack is intended for keeping tally of the total number of collars of one particular style, and such rack is provided with a tube, 12, for each size of collar of said style which it is desired to tally.

The number of delivery-chutes, 3, and keys, 10, by manipulation of which the balls are delivered to selected delivery-chutes correspond with the number of receptacle-tubes, 12, each key, 10, representing one size of collar.

In using the machine, the switch-bar, 25, above the rack for the particular style of collar to be counted, is moved to the position in which its guideways, 27, are in line with the respective delivery-chutes, and in line with the respective receptacle-tubes in the subjacent rack, and all the other switch-bars in advance thereof are moved to the position wherein their respective guideways, 26, are in line with one another and with the respective delivery-chutes. The machine is thus set for the count of said particular style of collar. The operator then at will strikes the several keys for the sizes which are to be counted, striking each key the proper number of times to correctly tally the count. Each time one of the keys is struck, one ball will be delivered into one of the delivery chutes, and will be deposited in the proper receptacle-tube 12.

Each ball may represent an individual article or a group of articles of the same size, as a dozen collars. The switch-bars are adjusted as above described for each particular style of collar to be counted, and they may be so adjusted by hand, or in any known manner. For the convenience of the operator I have, however, provided means whereby he can at will accomplish the desired adjustment of the switch-bars without leaving the keyboard of the machine.

The switch-plate, 23, is provided along its opposite sides with upwardly projecting side-plates, 30, upon each of which side-plates is mounted a series of electromagnets, 31, each having a movable core connected by a link, 32, with one arm of a bell-crank-lever, 33, fulcrumed at 34, the other arm of which bell-crank-lever is loosely pivotally connected with the ears, 35, on the end of one of the switch-bars.

For convenience, the magnets along one side-plate, 30, are thus connected with every other switch-bar, and the magnets along the other side-plate, 30, with the remaining switch-bars.

Each switch-bar has on its end opposite the end connected with the electromagnet a rod, 36, embraced by a coil-spring, 37, which acts to yieldingly hold the bar in the position in which the guideways, 26, are in line with the respective delivery-chutes, that is, in the position in which it permits the balls to pass by the subjacent rack.

When the electromagnet connected with one of the switch-bars is energized, that switch-bar will be thereby moved along its slideway against the force of the spring, 37, to the position where its guideways, 27, are in line with the respective delivery-chutes, in which position it will cause the balls passing along the several delivery-chutes to be directed downward into the receptacle-tubes in the subjacent rack.

The supply of electric current to the several electromagnets 31 is controlled by means of a switchboard, 40, having apertures, 41, corresponding with the different switch-bars and severally adapted to receive a switch-plug, 42, whereby the current can be directed to one of the electromagnets.

The switchboard may be connected with the electromagnets by wires in the usual manner, such connections being not shown in the drawings. The operator thus, by means of the switch-plug, 42, energizes the electromagnet controlling the switch-bar above the rack for the style of collar of which count is to be taken, leaving all the other switch-bars controlled by their respective springs 37. The switch-bar for the selected style thus remains under the control of the electromagnet until the switch-plug, 42, is removed. Thus in using the switch-bar for any selected style, all the other switch-bars remain in position to form straight continuations of the respective delivery-chutes.

The ball-receptacle tubes, 12, may be made wholly or in part of glass or other transparent material, or may be made of metal or other opaque material, and provided with an open slot, 45, through which the balls which accumulate in the tube can be inspected; and for convenience in determining the count the tubes may be provided with graduated scales numbered consecutively from the bottom upward, the graduation marks corresponding with the diameter of the balls, so that the figure or number opposite the topmost ball will correctly indicate the number of balls in the tube.

In taking the count from the tube-receptacles the several racks may be drawn wholly or partly from their slideway-supports, and emptied by removing the balls therefrom by inverting the racks or in any other known manner.

Figure 28:
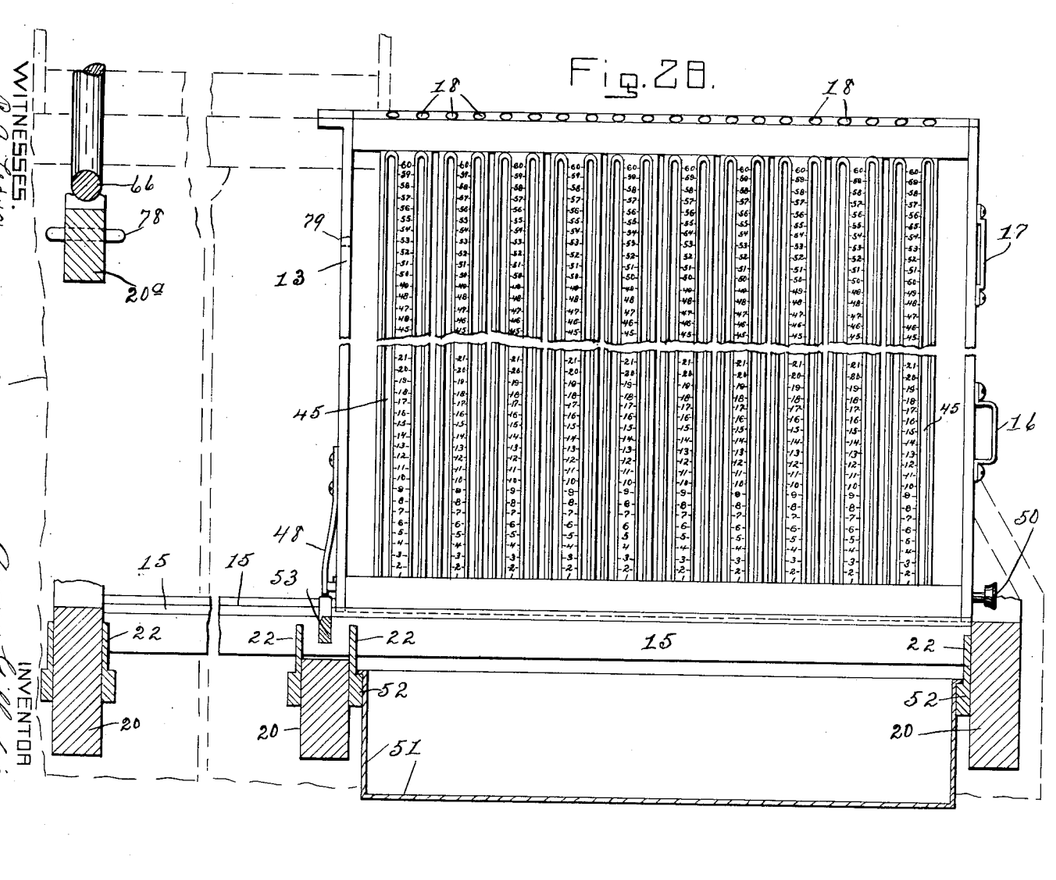
Fig. 28 is a view similar to a part of Fig. 10, showing one of the racks withdrawn to a position suitable for inspection of its contents and the emptying of the rack.

As a preferred means for emptying the racks, I have shown the bottom bar of each rack provided with apertures, 46, in line with the respective tubes, and adapted to be controlled by a slide-valve plate, 47, normally held by a spring, 48, in position to support the balls in the respective tubes of said rack, said slide-valve plate being provided with openings, 49, adapted to be brought into position to register with the respective tubes and apertures, 46, by movement of said plate, by means of a thumb-piece, 50, to permit the balls to escape from the tubes. A pan, 51, may be placed to receive the balls so escaping from the tubes, and is preferably placed in position to receive the balls from the tubes when the racks are wholly or partly withdrawn from the normal line of racks, as shown in Figs. 10 and 28, and said pan is mounted upon slideways, 52, extending longitudinally of the machine, whereby the pan can be slid along to a point opposite any selected rack in the series.

The racks of the series are adapted to be locked in their normal position in line with one another by means of a locking-bar, 53, having cam-lugs, 54, which ride upon certain of the slideway-bars, 15, said bars being slotted to permit the passage therethrough of said locking-bar. The locking-bar is operated by means of a lever, 57, fulcrumed at 58, and connected by link, 59, with said locking-bar. When the lever, 57, is forced inward, the engagement of the cam-lugs, 54, with the slideway-bars, 15, causes the locking-bar, 53, to rise to the position shown by solid lines at the righthand side of Fig. 10, in which position it laps on the outer side the lower ends of the several racks in the series.

Figure 2:
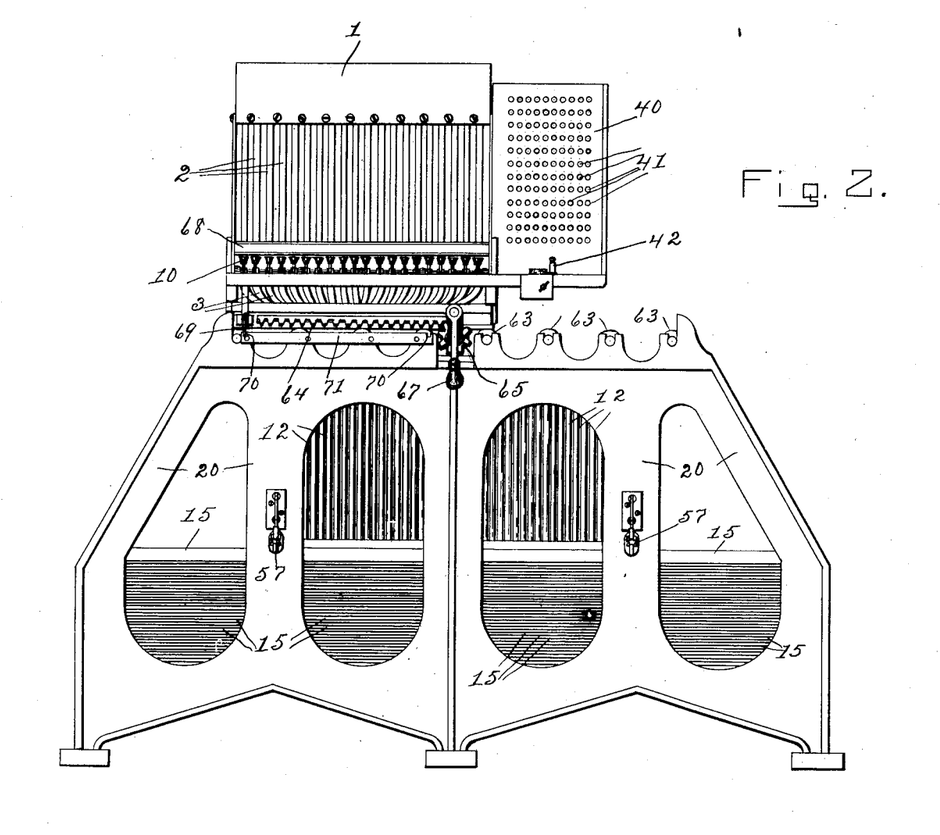
Fig. 2 is a view in front elevation on a smaller scale of the same.
Figures 3, 27:
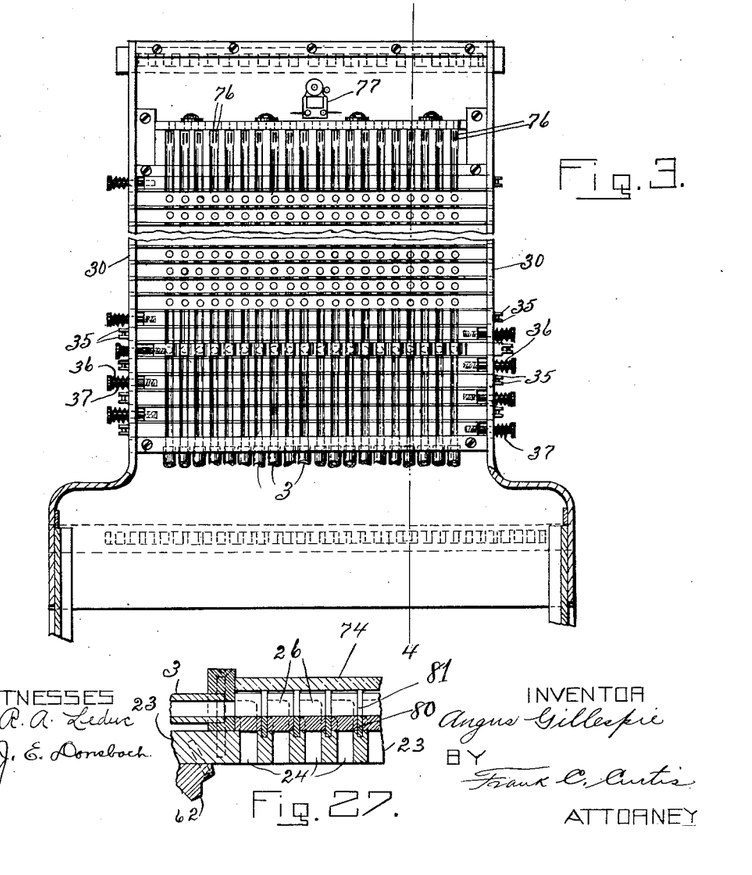
Fig. 3 is a section on the broken line 3—3 in Fig. 1, partly broken away, showing a plan view of certain of the switch-mechanisms, others of which are removed.
Fig. 27 is a view on an enlarged scale of a broken-away part of Fig. 4.
Figure 4:
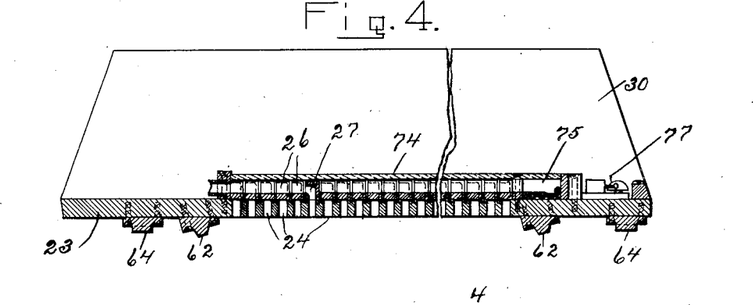
Fig. 4 is a vertical section taken on the broken line 4—4 in Fig. 3.

I have shown the keyboard, the switchboard, 40, magazine, 1, and the supply-and-delivery-chutes, all mounted upon the switch-plate, 23, which forms a carriage therefor, as well as for the switch-bars and the electromagnetic mechanism for operating the switch-bars; and the carriage thus formed is mounted by means of track-rails, 62, upon rollers, 63, rotatively mounted upon the stationary framework, 20, whereby the position of said carriage can be shifted transversely of the machine. I have also shown two series of ball-receptacle racks arranged side by side transversely of the machine, each adapted to be covered by said carriage in a certain position thereof, and to coöperate with said carriage and the mechanisms carried thereby in operating the machine in the manner above described. The framework, 20, is extended laterally to support the two sets or series of racks and the above described devices appurtenant thereto, as shown in Figs. 2 and 10. The carriage can thus be shifted from a position adapted to coöperate with one set or series of racks to a position adapted to coöperate with the other set or series of racks, and the carriage can be so shifted by hand, or in any other known manner.

I have shown gear-racks, 64, fixed upon the carriage in engagement with the respective pinions, 65, fixed upon the shaft, 66, which extends longitudinally of the machine, and has an operating crank-handle, 67, whereby the carriage can be conveniently moved back and forth transversely of the machine. The same keyboard, magazine, supply-and-delivery-chutes and switch-mechanism can thus be employed first for one set of racks and then for the other, permitting the machine to be used for a large number of styles of collars, and making it possible, if desired, for one operator to record the count or tally from one set of racks, and empty the balls therefrom, while another operator is delivering balls to the other set of racks.

The size of collar which each key, 10, is adapted to indicate may be displayed in connection with said key in any known manner.

Figures 21, 22, 23, 24, 25, 26:
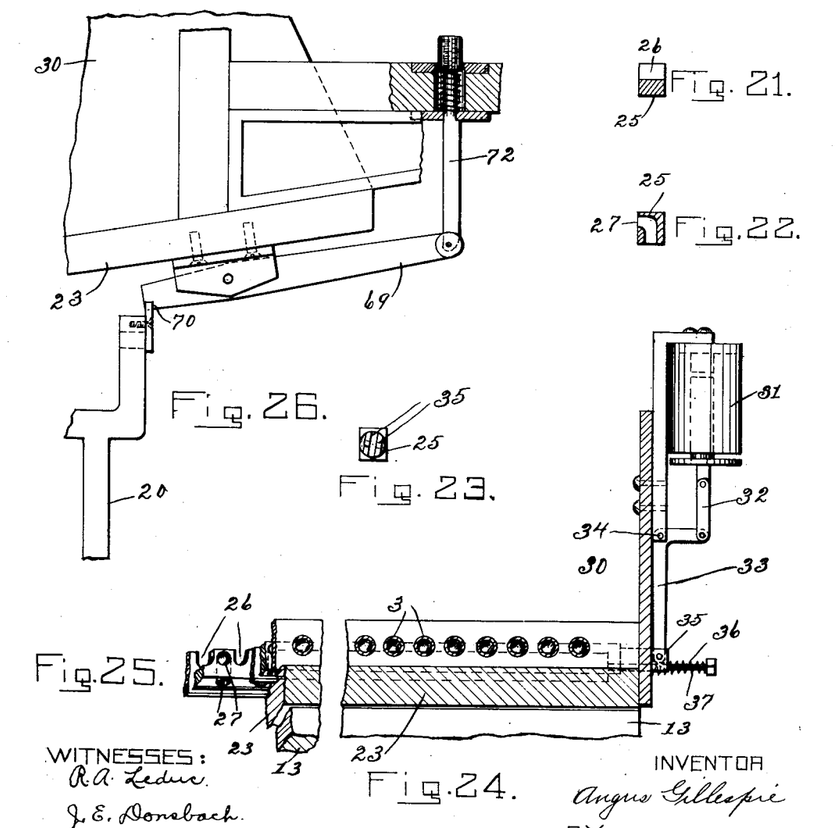
Fig. 21 is a vertical cross-section of the same taken on the broken line 21—21 in Fig. 19.
Fig. 22 is a similar section taken on the broken line 22—22 in Fig. 19.
Fig. 23 is an end view of the same.
Fig. 24 is a view partly in vertical section and partly in side elevation showing an electromagnet and connections for thereby inducing operation of a switch-bar.
Fig. 25 is a broken-away section of part of Fig. 24, shown in perspective.
Fig. 26 is a view in side elevation on an enlarged scale of a portion of Fig. 1, illustrating a hand-operated release device for the keyboard-carriage.

In Figs. 2 and 26, I have shown in detail a locking and release mechanism for the carriage, comprising a lever, 69, adapted to engage the several notches, 70, in a locking-plate, 71, mounted upon the stationary framework 20. A spring-controlled push-bar, 72, serves as a means whereby the lever, 69, can be withdrawn from a notch, 70, but will automatically enter either notch, 70, when brought opposite thereto by the lateral movement of the carriage, and thus serve to lock the carriage in the selected position.

I have shown a card-rack, 68, extending along the keyboard just above the keys, in which a card may be mounted bearing opposite each key the corresponding size number.

Figure 1:
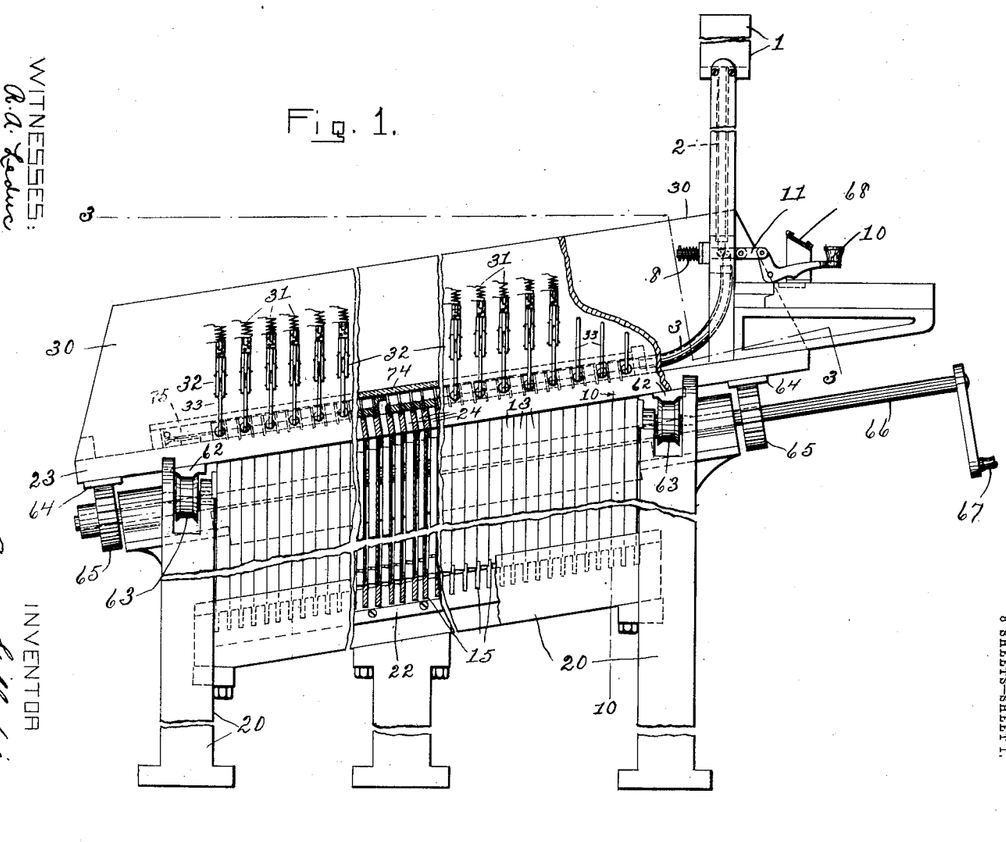
Figure 1 of the drawings is a view in side elevation partly broken away and partly in section, of my improved tally-machine.

The switch-plate, 23, and the slideway-supports for the racks are preferably arranged on a downward and rearward incline, as shown in Fig. 1, to facilitate the movement of the balls.

I have shown the several switch-bars covered by a plate, 74, which serves to prevent the balls from jumping out of the guideways, 26, which plate may be made of glass for convenience in inspecting the operation of the machine.

At a point in rear of the last of the switch-bars the switch-plate is provided with a recess or chamber, 75, in line with each delivery-chute, and adapted to receive balls from the delivery-chute, if none of the electromagnets should be energized, due to neglect of the operator or failure of the electric current. At the lower end of each chamber, 75, are exposed two contact-wires, 76, in electrical connection with an electromagnetically operated signal, 77, whereby a ball escaping into said chamber, 75, is adapted to electrically connect together said contact-wires, causing the closing of the alarm circuit and sounding of the alarm 77.

The electrical connections between the signal-mechanisms, 77, and the contact-wires, 76, are not shown in the drawings, as the same are well known.

The balls can be removed from the chambers, 75, by removing the plate, 74, or in any other desired manner.

The several racks are normally supported at their inner end each by a pin, 78, projecting from a stationary framework-bar, 20*, which pin is adapted to fit an opening, 79, in the inner side-bar of the rack, as shown in Fig. 10.

The slideways for the switch-bars are formed in part by vertical plates, 80, mounted in the switch-plate, 23, and projecting upward therefrom, said plates, 80, having guideway-grooves, 81, formed therein to form continuations of the delivery-chute.

What I claim as new and desire to secure by Letters Patent is—

1. In a tally-machine, and in combination, a ball-supply magazine; a chute; means for delivering balls from said magazine to said chute; a plurality of ball-receptacles arranged in line with said chute; and switch-mechanism having a guideway adapted in one position of said mechanism to form a continuation of said chute past one to another of said receptacles, and having a guideway adapted in another position of said mechanism to direct a ball from said chute into said receptacle.

2. In a tally-machine, and in combination, a plurality of supply-chutes; a ball-supply magazine for supplying balls to the several supply-chutes; a like plurality of delivery-chutes; a like plurality of key-operated mechanisms controlling the passage of balls from the several supply-chutes to the respective delivery-chutes; a plurality of ball-receptacles for each delivery-chute; and switch-mechanism for directing a ball from said delivery-chute to a selected one of said receptacles.

3. In a tally-machine, and in combination, a delivery-chute; means whereby balls can be delivered one at a time to said delivery-chute; a plurality of ball-receptacles; switch-mechanism for directing balls from the chute to a selected one of said receptacles; electromagnetic-mechanism for operating said switch-mechanism; and means whereby the operator can close the circuit for said electromagnetic mechanism.

4. In a tally-machine, and in combination, a delivery-chute; means whereby balls can be delivered one at a time to said chute; a plurality of ball-receptacles arranged one in rear of another; a switch-bar adapted in one position to direct a ball from the chute to one of said receptacles, and in another position to direct a ball from said chute past said receptacle; yielding means for holding said bar in one of said positions; electromagnetic-mechanism for moving said bar to the other of said positions; and means whereby the operator can close the circuit for said electromagnetic-mechanism.

5. In a tally-machine, and in combination, a delivery-chute; means whereby balls can be delivered one at a time to said chute; a switch-plate in fixed relation to said chute, and provided on its upper side with a plurality of slideways, and provided with a plurality of ball-apertures open to the respective slideways; switch-bars movable in the respective slideways, said switch-bars being severally provided with a guideway adapted in one position of the bar to be brought into line with said chute to guide a ball from said switch-bar to the next switch-bar, and also provided with another guideway adapted in another position of the bar to be brought into line with said chute to direct a ball therefrom down through the ball-aperture in its slideway; and ball receptacles removably supported beneath the respective ball-apertures in said switch-plate.

6. In a tally-machine, and in combination, a delivery-chute; means whereby balls can be delivered one at a time to said chute; a switch-plate in fixed relation to said chute, and provided on its upper side with a plurality of slideways, and with a plurality of ball-apertures open to the respective slideways; switch-bars movable in the respective slideways, said switch-bars being severally provided with a guideway adapted in one position of the bar to be brought into line with said chute to guide a ball from said switch-bar to the next switch-bar, and also provided with another guideway adapted in another position of the bar to be brought into line with said chute to direct a ball therefrom down through the ball-aperture in its slideway; ball-receptacles removably supported beneath the respective ball-apertures in said switch-plate; and electromagnetic-mechanism for moving a switch-bar from one to another of said positions.

7. In a tally-machine, and in combination, a plurality of delivery-chutes; means whereby balls can be delivered one at a time to selected delivery-chutes; a plurality of ball-receiving racks each having a ball-receptacle for each of the delivery-chutes; means whereby said racks are removably supported in line with the delivery-chutes; and switch-mechanism whereby a ball can be directed from a delivery-chute to the corresponding receptacle in a selected rack.

8. In a tally-machine, and in combination, a plurality of delivery-chutes; means for delivering balls one at a time to selected delivery-chutes; a plurality of slideways extending transversely of the delivery-chutes; racks insertible and removable along said slideways, each of said racks having a ball-receptacle for each of the delivery-chutes; and switch-mechanism whereby a ball can be directed from a delivery-chute to the corresponding receptacle in a selected rack.

9. In a tally-machine, and in combination, a plurality of delivery-chutes; means for delivering balls one at a time to selected delivery-chutes; a plurality of slideways extending transversely of the delivery-chutes; racks insertible and removable along said slideways, each of said racks having a ball-receptacle for each of the delivery-chutes; switch-mechanism whereby a ball can be directed from a delivery-chute to the corresponding receptacle in a selected rack; and means for locking said racks in position in their slideways.

10. In a tally-machine, and in combination, a plurality of racks, each having a plurality of ball-receptacles; slideways for the respective racks; means whereby balls can be delivered one at a time to selected receptacles in selected racks; and a slide-valve plate controlling the release of balls from the receptacles of each rack.

11. In a tally-machine, and in combination, a plurality of supply-chutes; a like plurality of delivery-chutes; a keyboard; a set of keys; key-operated mechanism controlling the delivery of balls from the supply-chutes to the respective delivery-chutes; a plurality of ball-receptacles in line with each delivery-chute; switch-mechanism whereby a ball can be directed from any delivery-chute to a selected receptacle in line therewith; electromagnetic mechanism for operating said switch-mechanism; and a switchboard adjacent to said keyboard for controlling the operation of the electromagnetic mechanism.

12. In a tally-machine, and in combination, a carriage; a plurality of delivery-chutes mounted upon said carriage; means mounted upon said carriage for delivering balls one at a time to selected delivery-chutes; a switch-plate mounted upon said carriage and provided with a plurality of apertures in line with each of said delivery-chutes; switch-mechanism mounted upon said carriage for directing a ball from any of said delivery-chutes to a selected one of said apertures in line therewith; means whereby the carriage can be moved from one position to another; a set of ball-receiving racks having ball-receptacles adapted to register with the respective apertures in said switch-plate in one position of said carriage; and another set of ball-receiving racks having ball-receptacles adapted to register with the respective apertures in said switch-plate in another position of said carriage.

13. In a tally-machine, and in combination, a carriage; a plurality of supply-chutes; a plurality of delivery-chutes mounted upon said carriage; a keyboard and keys mounted upon said carriage; key-operated mechanism for delivering balls one at a time from said supply-chutes to the respective delivery-chutes; a switch-plate mounted upon said carriage and provided with a plurality of apertures in line with each of said delivery-chutes; switch-mechanism mounted upon said carriage for directing a ball from any of said delivery-chutes to a selected one of said apertures in line therewith; means whereby the carriage can be moved from one position to another; a set of ball-receiving racks having ball-receptacles adapted to register with the respective apertures in said switch-plate in one position of said carriage; and another set of ball-receiving racks having ball-receptacles adapted to register with the respective apertures in said switch-plate in another position of said carriage.

In testimony whereof, I have hereunto set my hand this 16th day of February, 1911.

ANGUS GILLESPIE.

Witnesses:
J. E. DONSBACH,
WM. W. MORRILL.